United States Patent
Fu et al.

(10) Patent No.: US 12,395,835 B2
(45) Date of Patent: Aug. 19, 2025

(54) METHOD FOR ROUTING ACCESS, USER EQUIPMENT, AND STORAGE MEDIUM

(71) Applicant: BEIJING UNISOC COMMUNICATIONS TECHNOLOGY CO., LTD., Beijing (CN)

(72) Inventors: Zhiwei Fu, Beijing (CN); Yifan Bai, Beijing (CN)

(73) Assignee: BEIJING UNISOC COMMUNICATIONS TECHNOLOGY CO., LTD., Beijing (CN)

(*) Notice: Subject to any disclaimer, the term of this patent is extended or adjusted under 35 U.S.C. 154(b) by 359 days.

(21) Appl. No.: 17/925,081

(22) PCT Filed: Jul. 23, 2020

(86) PCT No.: PCT/CN2020/103786
§ 371 (c)(1),
(2) Date: Nov. 14, 2022

(87) PCT Pub. No.: WO2021/227254
PCT Pub. Date: Nov. 18, 2021

(65) Prior Publication Data
US 2023/0199482 A1    Jun. 22, 2023

(30) Foreign Application Priority Data

May 13, 2020    (CN) .................... 202010405332.3

(51) Int. Cl.
*H04W 12/03*    (2021.01)
*H04W 12/0431*    (2021.01)
(Continued)

(52) U.S. Cl.
CPC ....... *H04W 12/03* (2021.01); *H04W 12/0431* (2021.01); *H04W 12/72* (2021.01); *H04W 48/18* (2013.01); *H04W 76/10* (2018.02)

(58) Field of Classification Search
CPC . H04W 12/03; H04W 12/0431; H04W 12/72; H04W 48/18; H04W 76/10; H04L 41/0893
See application file for complete search history.

(56) References Cited

U.S. PATENT DOCUMENTS

2016/0094988 A1*  3/2016  Lee ................... H04L 9/0825
                                                          380/270
2018/0278534 A1    9/2018  Giaretta et al.
(Continued)

FOREIGN PATENT DOCUMENTS

CN    108366369 A    8/2018
CN    108632945 A    10/2018
(Continued)

OTHER PUBLICATIONS https://blog.csdn.net/SSY_1992/article/details/79094556."(non-official translation:Three Common iOS Encryption Types:MD5, Asymmetric Encryption, and Symmetric Encryption)" CSDN, Jan. 18, 2018.

(Continued)

*Primary Examiner* — Vance M Little
(74) *Attorney, Agent, or Firm* — HAUPTMAN HAM, LLP

(57) ABSTRACT

A method for routing access, user equipment (UE), and a medium are provided. The method includes: obtaining encrypted communication information of a target application, where the encrypted communication information is obtained by encrypting a traffic descriptor of the target application at a network server, obtaining the traffic descriptor of the target application by decrypting the encrypted (Continued)

communication information, determining a target network slice according to the traffic descriptor, and establishing a data transmission link for the target application through the target network slice.

19 Claims, 5 Drawing Sheets

(51) Int. Cl.
  *H04W 12/72* (2021.01)
  *H04W 48/18* (2009.01)
  *H04W 76/10* (2018.01)

(56) References Cited

U.S. PATENT DOCUMENTS

| | | | | |
|---|---|---|---|---|
| 2020/0107190 | A1* | 4/2020 | Tang | H04W 12/062 |
| 2020/0187085 | A1* | 6/2020 | Jagannatha | H04L 41/5041 |
| 2021/0195509 | A1* | 6/2021 | Ohlsson | H04W 12/037 |
| 2022/0264503 | A1* | 8/2022 | Starsinic | H04L 63/08 |

FOREIGN PATENT DOCUMENTS

| | | |
|---|---|---|
| CN | 109286567 A | 1/2019 |
| CN | 109600246 A | 4/2019 |
| CN | 109600768 A | 4/2019 |
| CN | 109743766 A | 5/2019 |
| CN | 109756357 A | 5/2019 |
| CN | 110602761 A | 12/2019 |
| CN | 110691384 A | 1/2020 |
| CN | 110808830 A | 2/2020 |
| CN | 110945836 A | 3/2020 |
| CN | 111034268 A | 4/2020 |
| WO | 2018231125 A1 | 12/2018 |
| WO | 2020092695 A1 | 5/2020 |

OTHER PUBLICATIONS

WIPO, International Search Report and Written Opinion for International Application No. PCT/CN2020/103786, Feb. 3, 2021.

The first office action issued in corresponding CN application No. 202010405332.3 dated Jan. 26, 2021.

The second office action issued in corresponding CN application No. 202010405332.3 dated May 13, 2021.

The third office action issued in corresponding CN application No. 202010405332.3 dated Aug. 5, 2021.

Notice of allowance issued in corresponding CN application No. 202010405332.3 dated Nov. 1, 2021.

* cited by examiner

METHOD FOR ROUTING ACCESS, USER EQUIPMENT, AND STORAGE MEDIUM

CROSS-REFERENCE TO RELATED APPLICATION(S)

This application is a National Stage of International Application No. PCT/CN2020/103786, field Jul. 23, 2020, which claims priority to Chinese Patent Application No. 202010405332.3, filed May 13, 2020, the disclosures of which are hereby incorporated by reference in their entirety.

TECHNICAL FIELD

The disclosure relates to the technical field of signal processing, in particular to the field of routing access, and more particularly, to a method for routing access, user equipment (UE), and a storage medium.

BACKGROUND

With the development of electronic technologies, electronic devices are becoming more and more functional, the amount of data to be transmitted is increasing, which in turn reduces the data transmission efficiency of the entire network and increases the possibility of data transmission congestion. Therefore, the configuration of differentiated data transmission policies has become an important way to improve the data transmission efficiency and the network quality. Mobile network operators can configure different network slices for transmitting data of different applications. However, how to ensure the implementation of these policies becomes an open problem.

SUMMARY

In a first aspect, implementations of the disclosure provide a method for routing access. The method is applicable to user equipment (UE) and includes: obtaining encrypted communication information of a target application, where the encrypted communication information is obtained by encrypting a traffic descriptor of the target application at a network server, obtaining the traffic descriptor of the target application by decrypting the encrypted communication information, determining a target network slice according to the traffic descriptor, and establishing a data transmission link for the target application through the target network slice.

In a second aspect, implementations of the disclosure provide a UE. The UE includes a memory configured to store one or more programs and a processor configured to invoke and execute the one or more programs to: obtain encrypted communication information of a target application, obtain the traffic descriptor of the target application by decrypting the encrypted communication information, determine a target network slice according to the traffic descriptor, and establish a data transmission link for the target application through the target network slice.

In a third aspect, implementations of the disclosure provide a non-transitory computer-readable storage medium. The computer-readable storage medium stores computer programs which are operable with a computer to: obtain encrypted communication information of a target application, obtain the traffic descriptor of the target application by decrypting the encrypted communication information, determine a target network slice according to the traffic descrip-tor, and establish a data transmission link for the target application through the target network slice.

BRIEF DESCRIPTION OF THE DRAWINGS

To describe technical solutions of implementations of the disclosure more clearly, the following briefly introduces the drawings required for description of implementations. Apparently, the drawings in the following description are some implementations of the disclosure. Those of ordinary skill in the art may also obtain other drawings based on these drawings without creative efforts.

DETAILED DESCRIPTION

Technical solutions in implementations of the disclosure will be described clearly and completely below with reference to the drawings in implementations of the disclosure. Apparently, the described implementations are only a part of rather than all of implementations of the disclosure. Based on implementations of the disclosure, all other implementations obtained by those of ordinary skill in the art without creative efforts shall fall within the protection scope of the disclosure.

It should be noted that, the terms "first", "second", and the like in the specification and the claims of implementations of the disclosure are used to distinguish different objects rather than describe a specific order.

Figure 1A:
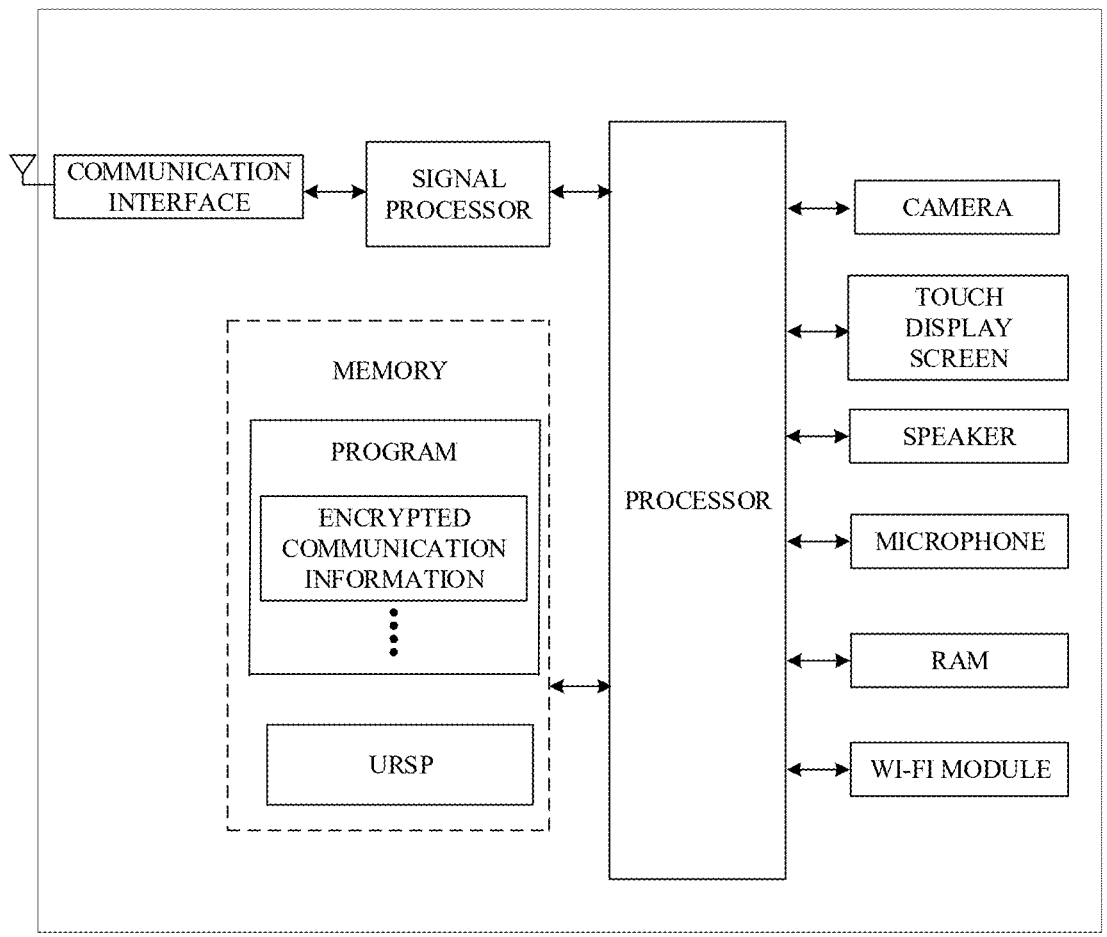
FIG. 1A is a schematic structural diagram of user equipment (UE) provided in implementations of the disclosure.

Referring to FIG. 1A, FIG. 1A is a schematic structural diagram of user equipment (UE) provided in implementations of the disclosure. The electronic device includes a processor, a memory, a signal processor, a communication interface, a touch display screen, a wireless fidelity (Wi-Fi) module, a speaker, a microphone, a random access memory (RAM), a camera, etc.

The memory, the signal processor, the Wi-Fi module, the touch display screen, the speaker, the microphone, the RAM, and the camera are connected with the processor, and the communication interface is connected with the signal processor.

The memory stores application data. The application data includes encrypted communication information of an application. The memory may also store a UE routing selection policy (URSP) obtained from a mobile core network. The processor may invoke the encrypted communication information and the URSP in the memory, and then determine a network slice corresponding to the application.

The UE can be various handheld devices, vehicle-mounted devices, wearable devices, such as smart watches, smart bracelets, pedometers, etc., and computing devices with wireless communication functions, or other processing devices connected to a wireless modem, and various UEs, mobile stations (MS), terminal devices, etc. For the convenience of description, the devices mentioned above are collectively referred to as UE.

Figure 1B:
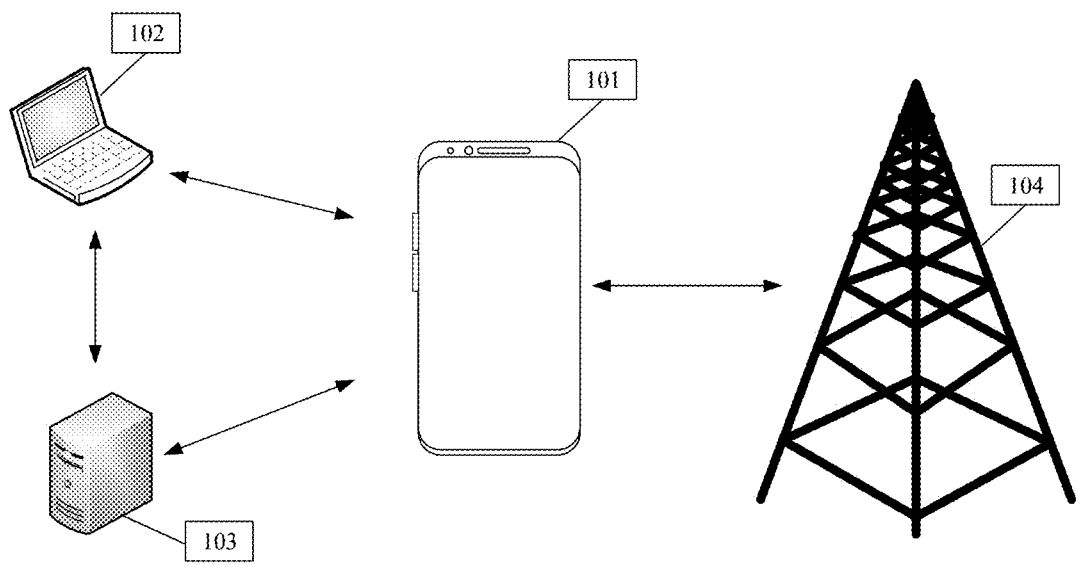
FIG. 1B is a schematic diagram illustrating an architecture of a system provided in implementations of the disclosure.

Referring to FIG. 1B, FIG. 1B is a schematic diagram illustrating an architecture of a system provided in implementations of the disclosure. The system includes a UE 101, a development device 102, a network server 103, and a base station 104. The UE 101, the development device 102, and the network server 103 are communicatively connected with each other. The UE 101 is also communicatively connected with the base station 104. In implementations of the disclosure, the development device 102 can be used for a developer to develop a target application, to obtain a data package of the target application. Then, the development device 102 transmits the data package of the target application to the network server 103. The network server 103 extracts a traffic descriptor from the data package of the target application, and obtains encrypted communication information by encrypting the traffic descriptor with a symmetric encryption algorithm. The network server 103 transmits the encrypted communication information to the development device 102. The development device 102 packages the encrypted communication information into the data package of the target application, to update the data package of the target application. Then, the development device 102 transmits the data package of the target application to the UE 101. The UE 101 installs the target application according to the data package of the target application. The UE 101 can receive a URSP from a mobile core network via the base station 104. Then, when the target application initiates a networking request, the UE 101 can extract the encrypted communication information of the target application, and obtain the traffic descriptor by decrypting the encrypted communication information according to an obtained key for decrypting the encrypted communication information. Then, the UE 101 determines a target network slice of the target application according to the traffic descriptor and the URSP, and establishes a data transmission link for the target application through the target network slice.

Figure 2:
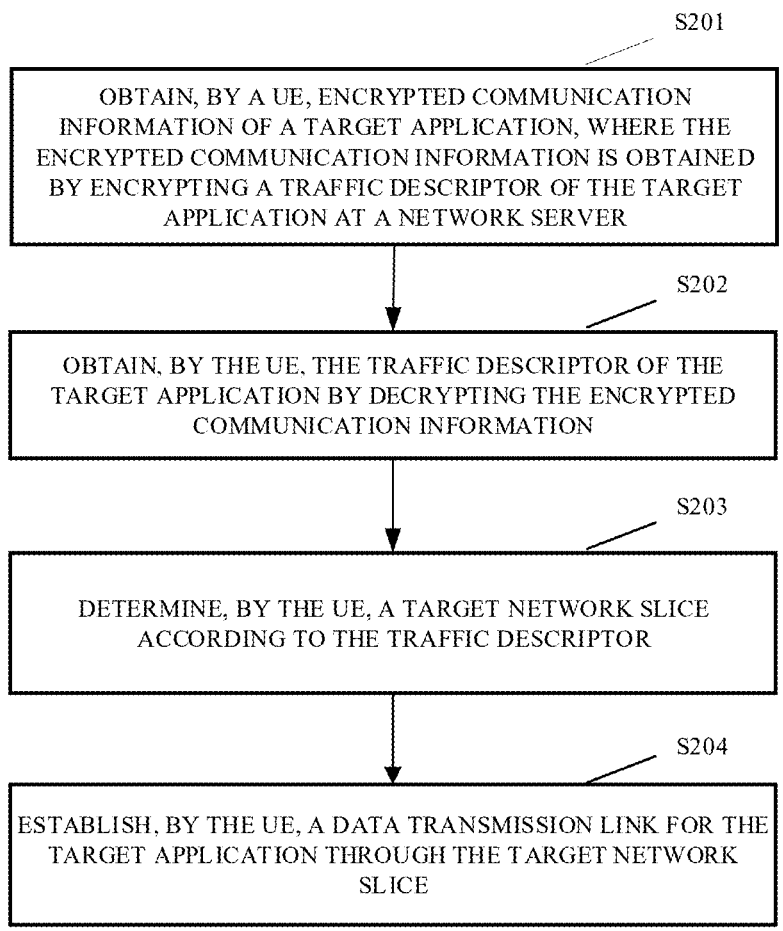
FIG. 2 is a schematic flowchart of a method for routing access provided in implementations of the disclosure.

Based on the above description, implementations of the disclosure provide a method for routing access, and the method is applicable to a UE. Referring to FIG. 2, the method for routing access may include S201 to S204.

S201. The UE obtains encrypted communication information of a target application, where the encrypted communication information is obtained by encrypting a traffic descriptor of the target application at a network server.

At present, the fifth-generation (5G) mobile communication technology is developing rapidly. The 3rd generation partnership project (3GPP) defines a URSP, where each URSP rule contains one traffic descriptor, and each traffic descriptor may contain at least one of: an application descriptor, an internet protocol (IP) descriptor, a domain descriptor, connection capabilities, etc. With the URSP rule, the UE can determine a network slice corresponding to an application according to a traffic descriptor of the application, thereby realizing on-demand networking and improving the data transmission rate of the network. Specifically, a network operator corresponding to the mobile core network can provide different network service qualities for different applications according to the application descriptor defined in the URSP. For example, application A may be game software, and an agreement is reached between application A and the network operator to provide a network slice with the lowest latency for application A when application A accesses the network. Application B may be download software, and an agreement is reached between application B and the network operator to provide a network slice with the largest bandwidth and the highest average network speed for application B when application B accesses the network. Application C is, for example, banking software requiring high security, then an agreement is reached between application C and the network operator to provide a network slice with the highest security for application C when application C accesses the network.

The encrypted communication information is obtained by performing symmetric encryption on the traffic descriptor of the target application. Alternatively, the encrypted communication information is obtained by performing symmetric encryption and then asymmetric encryption on the traffic descriptor.

The network server may be a network server of the operator or server of the global system for mobile communications association (GSMA). Before the UE obtains the encrypted communication information of the target application, the developer uses the development device to transmit the data package of the target application to the network server after completing the development of the target application at the development device. The network server extracts the traffic descriptor from the data package of the target application, obtains the encrypted communication information by encrypting the traffic descriptor, and then transmits the encrypted communication information to the development device. The development device packages the encrypted communication information into the data package of the target application, and transmits the data package of the target application to the UE. The UE installs the target application according to the data package of the target application. When the UE runs the target application, if the target application requests to connect to the mobile core network, specifically, a 5G core network, the UE performs S201.

S202. The UE obtains the traffic descriptor of the target application by decrypting the encrypted communication information.

The UE can decrypt the encrypted communication information with a key for decrypting the encrypted communication information. If the encrypted communication information is obtained by performing symmetric encryption on the traffic descriptor, the UE obtains the traffic descriptor by decrypting the encrypted communication information based on a key mechanism defined in 3GPP for 5G, specifically, a K key or K_AMF and a derived CK key, or with a symmetric key issued by the network. If the encrypted communication information is obtained by performing symmetric encryption and then asymmetric encryption on the traffic descriptor, the traffic descriptor can be obtained by performing on the encrypted communication information asymmetric decryption with a decryption key for the asymmetric encryption and then a decryption process for the symmetric encryption.

S203. The UE determines a target network slice according to the traffic descriptor.

The UE may receive a URSP issued by the mobile core network, specifically, the 5G core network. Different applications may have different traffic descriptors. The UE can query the URSP with the traffic descriptor to determine a network slice corresponding to the traffic descriptor, that is, a network slice corresponding to the application.

S204. The UE establishes a data transmission link for the target application through the target network slice.

Optionally, after the UE determines the target network slice according to the traffic descriptor, the UE may transmit a load information request to the mobile core network. The mobile core network transmits load information of at least two network slices including the target network slice to the UE. The UE determines a load level of the target network slice according to the load information. If the load level of the target network slice is greater than a preset load value, the UE determines a second network slice with a load level lower than the preset load value according to the load information, transmits to the mobile core network request information for establishing a data transmission link through the second network slice. If the mobile core network returns confirmation information, the UE establishes the data transmission link through the second network slice. That is, the UE establishes the data transmission link through the target network slice and the second network slice. When the target application requests to transmit target data, a security level of the target data is detected. If the security level of the target data is lower than a preset security level, the target data is transmitted via the data transmission link established through the second network slice. If the security level of the target data is higher than or equal to the preset security level, the target data is transmitted via the data transmission link established through the target network slice.

It can be seen that, in implementations of the disclosure, the UE obtains the encrypted communication information of the target application, where the encrypted communication information is obtained by encrypting the traffic descriptor of the target application at the network server. Then, the UE obtains the traffic descriptor of the target application by decrypting the encrypted communication information, and determines the target network slice according to the traffic descriptor. Finally, the UE establishes the data transmission link for the target application through the target network slice. It can be seen that, in implementations of the disclosure, the UE can obtain the traffic descriptor by decrypting the encrypted communication information encrypted at the network server, which avoids abnormal operations such as tampering and forgery of the traffic descriptor by an application, and ensures the reliability of the target network slice determined according to the traffic descriptor, thereby improving the reliability of the data transmission link established according to the target network slice, and improving the security of the network.

In a possible implementation, the encrypted communication information is obtained by performing symmetric encryption on the traffic descriptor at the network server.

It can be seen that, in this example, the traffic descriptor in the target application is in a symmetric encryption form, so that the target application is unable to tamper with or forge the traffic descriptor, which ensures the accuracy of the network slice allocated for the target application. In this way, network resources of the mobile core network can be reasonably allocated, and the data transmission rate of the network can be improved. In addition, different network slices are configured for different applications, so data theft against the target network slice by other applications can be avoided, thereby ensuring the security of data transmission.

In a possible implementation, the encrypted communication information is obtained by performing symmetric encryption and asymmetric encryption on the traffic descriptor at the network server.

The asymmetric encryption may be performed with an RSA encryption algorithm.

It can be seen that, in this example, the UE can further perform asymmetric encryption after performing symmetric encryption on the traffic descriptor, thereby improving the security of data transmission and avoiding data tampering during transmission.

In a possible implementation, subsequent to obtaining the encrypted communication information of the target application, and prior to obtaining the traffic descriptor of the target application by decrypting the encrypted communication information, the method further includes: obtaining a key for decrypting the encrypted communication information into the traffic descriptor.

It can be seen that, in this example, the UE can obtain the key for decrypting the encrypted communication information, and then obtain the traffic descriptor.

In a possible implementation, obtaining the key includes: extracting the key from a universal subscriber identity module (USIM), obtaining the key from a non-access stratum (NAS) signaling received from a mobile core network, where the NAS signaling includes the key, or obtaining the key through an open network.

Specifically, the open network may be the Internet.

In a possible implementation, obtaining the key through the open network includes: registering the UE with a mobile core network through the open network, establishing a default protocol data unit (PDU) session with the mobile core network, establishing a communication connection with the network server through the default PDU session, and receiving the key from the network server.

The key may be received from the network server through an encrypted transmission mechanism, specifically, secure sockets layer (SSL), internet protocol security (IPSec), etc.

In a possible implementation, determining the target network slice according to the traffic descriptor includes: obtaining a first network slice corresponding to a query identifier by querying a URSP with the traffic descriptor as the query identifier, where the URSP includes a correspondence between traffic descriptors and network slices, and determining the first network slice as the target network slice.

Specifically, the traffic descriptor includes an application descriptor, and the URSP includes the correspondence between application descriptors and network slices. The UE can query the URSP according to the application descriptor of the target application, and then determine the corresponding target network slice.

It can be seen that, in this example, the UE can determine the target network slice according to the URSP and the traffic descriptor of the target application, which ensures the reliability of network resource allocation and improves the data transmission rate of the network.

In a possible implementation, prior to querying the URSP, the method further includes: receiving the URSP from a mobile core network.

Figure 3:
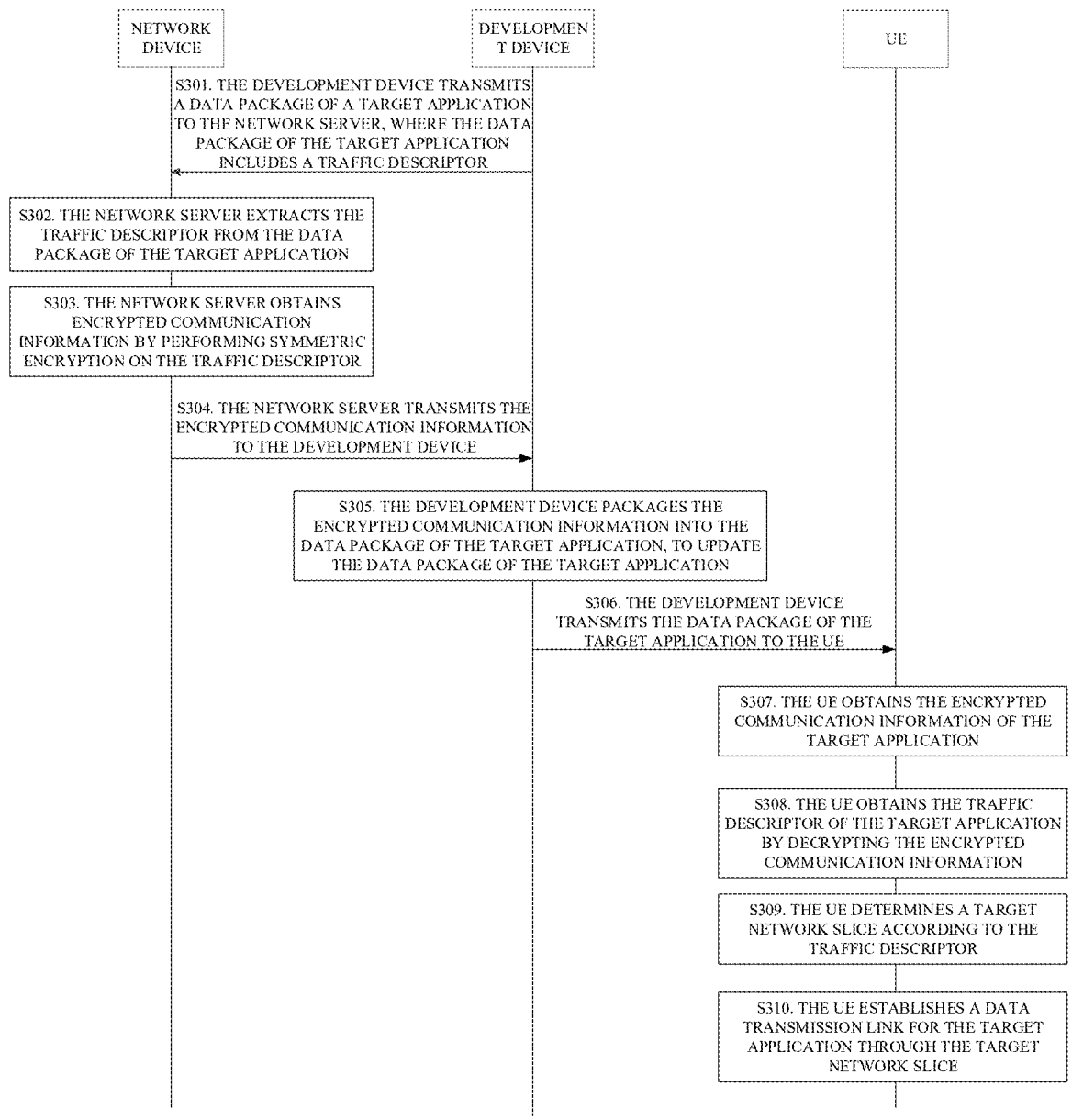
FIG. 3 is a schematic diagram of an interaction flow of a method for routing access provided in implementations of the disclosure.

Referring to FIG. 3, FIG. 3 is a schematic diagram of an interaction flow of a method for routing access provided in implementations of the disclosure. The method for routing access may include S301 to S310.

S301. The development device transmits a data package of a target application to the network server, where the data package of the target application includes a traffic descriptor.

S302. The network server extracts the traffic descriptor from the data package of the target application.

S303. The network server obtains encrypted communication information by performing symmetric encryption on the traffic descriptor.

S304. The network server transmits the encrypted communication information to the development device.

S305. The development device packages the encrypted communication information into the data package of the target application, to update the data package of the target application.

S306. The development device transmits the data package of the target application to the UE.

S307. The UE obtains the encrypted communication information of the target application.

S308. The UE obtains the traffic descriptor of the target application by decrypting the encrypted communication information.

S309. The UE determines a target network slice according to the traffic descriptor.

S310. The UE establishes a data transmission link for the target application through the target network slice.

It can be seen that, in implementations of the disclosure, the UE obtains the encrypted communication information of the target application, where the encrypted communication information is obtained by encrypting the traffic descriptor of the target application at the network server. Then, the UE obtains the traffic descriptor of the target application by decrypting the encrypted communication information, and determines the target network slice according to the traffic descriptor. Finally, the UE establishes the data transmission link for the target application through the target network slice. It can be seen that, in implementations of the disclosure, the UE can obtain the traffic descriptor by decrypting the encrypted communication information encrypted at the network server, which avoids abnormal operations such as tampering and forgery of the traffic descriptor by an application, and ensures the reliability of the target network slice determined according to the traffic descriptor, thereby improving the reliability of the data transmission link established according to the target network slice, and improving the security of the network.

Figure 4:
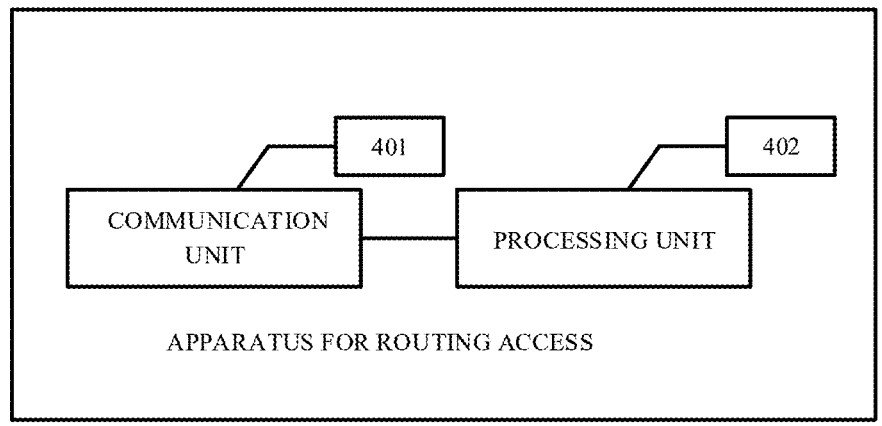
FIG. 4 is a schematic structural diagram of an apparatus for routing access provided in implementations of the disclosure.

Based on the description of implementations of the method for routing access, implementations of the disclosure further provide an apparatus for routing access. The apparatus may be a computer program including program codes running on a UE. The apparatus for routing access can perform the method illustrated in FIG. 2. Referring to FIG. 4, the apparatus for routing access may operate a communication unit 401 and a processing unit 402.

The communication unit 401 is configured to obtain encrypted communication information of a target application, where the encrypted communication information is obtained by encrypting a traffic descriptor of the target application at a network server. The processing unit 402 is configured to obtain the traffic descriptor of the target application by decrypting the encrypted communication information, and determine a target network slice according to the traffic descriptor. The communication unit 401 is further configured to establish a data transmission link for the target application through the target network slice.

The communication unit 401 may be a touch screen display or a transceiver.

It can be seen that, in implementations of the disclosure, the UE obtains the encrypted communication information of the target application, where the encrypted communication information is obtained by encrypting the traffic descriptor of the target application at the network server. Then, the UE obtains the traffic descriptor of the target application by decrypting the encrypted communication information, and determines the target network slice according to the traffic descriptor. Finally, the UE establishes the data transmission link for the target application through the target network slice. It can be seen that, in implementations of the disclosure, the UE can obtain the traffic descriptor by decrypting the encrypted communication information encrypted at the network server, which avoids abnormal operations such as tampering and forgery of the traffic descriptor by an application, and ensures the reliability of the target network slice determined according to the traffic descriptor, thereby improving the reliability of the data transmission link established according to the target network slice, and improving the security of the network.

In a possible implementation, the encrypted communication information is obtained by performing symmetric encryption on the traffic descriptor at the network server.

In a possible implementation, the encrypted communication information is obtained by performing symmetric encryption and asymmetric encryption on the traffic descriptor at the network server.

In a possible implementation, subsequent to obtaining the encrypted communication information of the target application, and prior to obtaining the traffic descriptor of the target application by decrypting the encrypted communication information, the processing unit 401 is specifically configured to: obtain a key for decrypting the encrypted communication information into the traffic descriptor.

In a possible implementation, in terms of obtaining the key, the processing unit 401 is specifically configured to: extract the key from a USIM, obtain the key from a NAS signaling received from a mobile core network, where the NAS signaling includes the key, or obtain the key through an open network.

In a possible implementation, in terms of obtaining the key through the open network, the processing unit 401 is specifically configured to: register the UE with a mobile core network through the open network, establish a default PDU session with the mobile core network, establish a communication connection with the network server through the default PDU session, and receive the key from the network server.

In a possible implementation, in terms of determining the target network slice according to the traffic descriptor, the processing unit 401 is specifically configured to: obtain a first network slice corresponding to a query identifier by querying a URSP with the traffic descriptor as the query identifier, where the URSP includes a correspondence between traffic descriptors and network slices, and determine the first network slice as the target network slice.

In a possible implementation, prior to querying the URSP, the processing unit 401 is specifically configured to: receive the URSP from a mobile core network.

According to other implementations of the disclosure, various units in the apparatus for routing access illustrated in FIG. 4 can be respectively or all combined into one or several other units, or some unit(s) can be subdivided into multiple smaller units in terms of functions, which can implement the same operations without affecting realization of the technical effect of the implementations of the disclosure. The above units are divided based on logical functions. In practice, functions of one unit can also be realized by multiple units, or functions of multiple units can be realized by one unit. In other implementations of the disclosure, the apparatuses for routing access can also include other units. In practice, these functions can also be implemented with aid of other units, and can be implemented by multiple units cooperatively.

According to other implementations of the disclosure, a computer program (including program codes) that can perform steps in the corresponding method illustrated in FIGS. 2 and 3 may be run on a general computing device, such as a computer, which includes processing elements and storage elements such as a CPU, a RAM, and a ROM, to construct the apparatus for routing access illustrated in FIG. 4 and implement the method for routing access in implementations of the disclosure. The computer program may be recorded in, for example, a computer readable recording medium, and may be loaded into the foregoing computing device by using the computer readable recording medium, and run on the computing device.

Figure 5:
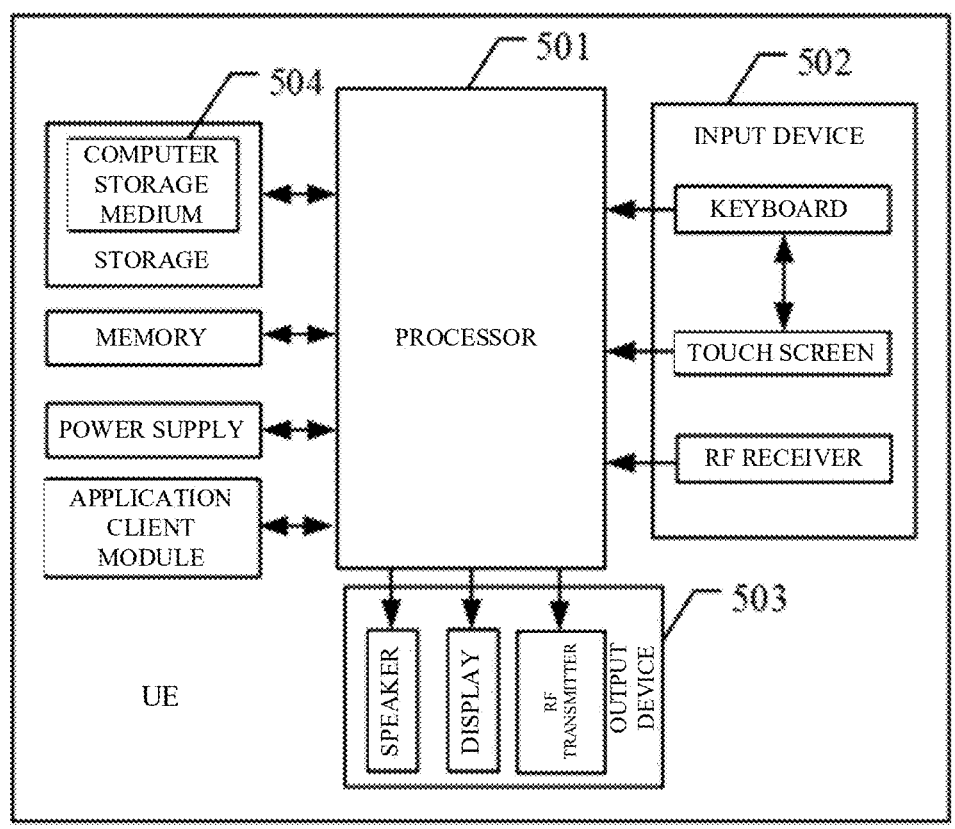
FIG. 5 is a schematic structural diagram of a UE provided in implementations of the disclosure.

Based on the description of method implementations and apparatus implementations, implementations of the disclosure further provide a UE. Referring to FIG. 5, the UE at least includes a processor 501, an input device 502, an output device 503, and a computer storage medium 504. The processor 501, the input device 502, the output device 503, and the computer storage medium 504 in the electronic device may be connected via a bus or in another manner.

The computer storage medium 504 may be stored in a memory of the electronic device. The computer storage medium 504 is configured to store a computer program. The computer program includes program instructions. The processor 501 is configured to execute the program instructions stored in the computer storage medium 504. The processor 501 (or referred to as a CPU) is a computing core and a control core of the electronic device, which is suitable for implementing one or more instructions, and is specifically suitable for loading and executing one or more instructions to implement a corresponding method procedure or a corresponding function. In some implementations, the processor 501 in implementations of the disclosure may be configured to perform a series of routing access processing, including: obtaining encrypted communication information of a target application, where the encrypted communication information is obtained by encrypting a traffic descriptor of the target application at a network server, obtaining the traffic descriptor of the target application by decrypting the encrypted communication information, determining a target network slice according to the traffic descriptor, and establishing a data transmission link for the target application through the target network slice.

Implementations of the disclosure further provide a computer storage medium. The computer storage medium is a memory device in an electronic device and is configured to store programs and data. It can be understood that, the computer storage medium herein may include an internal storage medium of the electronic device, and certainly may also include an extended storage medium supported by the electronic device. The computer storage medium provides storage space in which an operating system of the electronic device is stored. In addition, one or more instructions suitable for being loaded and executed by the processor 501 are also stored in the storage space. The instructions may be one or more computer programs (including program codes). It should be noted that, the computer storage medium herein may be a high-speed RAM or a non-volatile memory, for example, at least one magnetic disk memory. Optionally, the computer storage medium may be at least one computer storage medium located away from the processor.

In some implementations, the processor 501 may load and execute one or more instructions stored in the computer storage medium, to implement corresponding steps of in the foregoing implementations of the method for routing access. During specific implementation, the one or more instructions in the computer storage medium are loaded by the processor 501 to perform: obtaining encrypted communication information of a target application, where the encrypted communication information is obtained by encrypting a traffic descriptor of the target application at a network server, obtaining the traffic descriptor of the target application by decrypting the encrypted communication information, determining a target network slice according to the traffic descriptor, and establishing a data transmission link for the target application through the target network slice.

In a possible implementation, the encrypted communication information is obtained by performing symmetric encryption on the traffic descriptor at the network server.

In a possible implementation, the encrypted communication information is obtained by performing symmetric encryption and asymmetric encryption on the traffic descriptor at the network server.

In a possible implementation, subsequent to obtaining the encrypted communication information of the target application, and prior to obtaining the traffic descriptor of the target application by decrypting the encrypted communication information, the one or more instructions may further be loaded by the processor 501 to specifically perform: obtaining a key for decrypting the encrypted communication information into the traffic descriptor.

In a possible implementation, in terms of obtaining the key, the one or more instructions may further be loaded by the processor 501 to specifically perform: extracting the key from a USIM, obtaining the key from a NAS signaling received from a mobile core network, where the NAS signaling includes the key, or obtaining the key through an open network.

In a possible implementation, in terms of obtaining the key through the open network, the one or more instructions may further be loaded by the processor 501 to specifically perform: registering the UE with a mobile core network through the open network, establishing a default PDU session with the mobile core network, establishing a communication connection with the network server through the default PDU session, and receiving the key from the network server.

In a possible implementation, in terms of determining the target network slice according to the traffic descriptor, the one or more instructions may further be loaded by the processor 501 to specifically perform: obtaining a first network slice corresponding to a query identifier by querying a URSP with the traffic descriptor as the query identifier, where the URSP includes a correspondence between traffic descriptors and network slices, and determining the first network slice as the target network slice.

In a possible implementation, prior to querying the URSP, the one or more instructions may further be loaded by the processor 501 to specifically perform: receiving the URSP from a mobile core network.

It can be seen that, in implementations of the disclosure, the UE obtains the encrypted communication information of the target application, where the encrypted communication information is obtained by encrypting the traffic descriptor of the target application at the network server. Then, the UE obtains the traffic descriptor of the target application by decrypting the encrypted communication information, and determines the target network slice according to the traffic descriptor. Finally, the UE establishes the data transmission link for the target application through the target network slice. It can be seen that, in implementations of the disclosure, the UE can obtain the traffic descriptor by decrypting the encrypted communication information encrypted at the network server, which avoids abnormal operations such as tampering and forgery of the traffic descriptor by an application, and ensures the reliability of the target network slice determined according to the traffic descriptor, thereby improving the reliability of the data transmission link established according to the target network slice, and improving the security of the network.

Implementations of the disclosure further provide a computer program product. The computer program product includes a non-transitory computer-readable storage medium storing computer programs. The computer programs are operable with a computer to perform some or all of steps in any method described in implementations described above. The computer program product may be a software installation package. The computer includes a mobile terminal.

It should be noted that, for the sake of simplicity, the foregoing method implementations are described as a series of action combinations, however, it will be appreciated by those skilled in the art that the disclosure is not limited by the sequence of actions described. According to the disclosure, certain steps or operations may be performed in other order or simultaneously. Besides, it will be appreciated by those skilled in the art that the implementations described in the specification are exemplary implementations and the actions and modules involved are not necessarily essential to the disclosure.

In foregoing implementations, the description of each implementation has its own emphasis. For the parts not described in detail in one implementation, reference may be made to related descriptions in other implementations.

In implementations of the disclosure, it should be understood that, the apparatus disclosed in implementations provided herein may be implemented in other manners. For example, the device/apparatus implementations described above are merely illustrative. For instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be an electrical connection, a mechanical connection, or other forms of connections.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the disclosure may be integrated into one control unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the disclosure essentially, or the part of the technical solutions that contributes to the related art, or all or part of the technical solutions, may be embodied in the form of a software product which is stored in a memory and includes instructions for causing a computer device, which may be a personal computer, a server, or a network device, and the like, to perform all or part of the steps described in the various implementations of the disclosure. The memory includes various medium capable of storing program codes, such as a universal serial bus (USB) flash disk, a read-only memory (ROM), a RAM, a removable hard disk, a disk, a compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a ROM, a RAM, a disk, or a CD, and the like.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

Disclosed above are some preferred implementations of the disclosure, and the scope of the disclosure cannot be limited by these implementations. Therefore, equivalent changes made according to the claims of the disclosure shall fall within the scope of the disclosure.

Implementations of the disclosure provide a method and an apparatus for routing access, an electronic device, and a computer storage medium. Implementations of the disclosure help to avoid forgery and tampering of traffic descriptors during transmission, thereby ensuring the reliability of network allocation and improving the security of the network.

In a first aspect, implementations of the disclosure provide a method for routing access. The method is applicable to user equipment (UE) and includes: obtaining encrypted communication information of a target application, where the encrypted communication information is obtained by encrypting a traffic descriptor of the target application at a network server, obtaining the traffic descriptor of the target application by decrypting the encrypted communication information, determining a target network slice according to the traffic descriptor, and establishing a data transmission link for the target application through the target network slice.

In a possible implementation, the encrypted communication information is obtained by performing symmetric encryption on the traffic descriptor at the network server.

In a possible implementation, the encrypted communication information is obtained by performing symmetric encryption and asymmetric encryption on the traffic descriptor at the network server.

In a possible implementation, subsequent to obtaining the encrypted communication information of the target application, and prior to obtaining the traffic descriptor of the target application by decrypting the encrypted communication information, the method further includes: obtaining a key for decrypting the encrypted communication information into the traffic descriptor.

In a possible implementation, obtaining the key includes: extracting the key from a universal subscriber identity module (USIM), obtaining the key from a non-access stratum (NAS) signaling received from a mobile core network, where the NAS signaling includes the key, or obtaining the key through an open network.

In a possible implementation, obtaining the key through the open network includes: registering the UE with a mobile core network through the open network, establishing a default protocol data unit (PDU) session with the mobile core network, establishing a communication connection with the network server through the default PDU session, and receiving the key from the network server.

In a possible implementation, determining the target network slice according to the traffic descriptor includes: obtaining a first network slice corresponding to a query identifier by querying a UE routing selection policy (URSP) with the traffic descriptor as the query identifier, where the URSP includes a correspondence between traffic descriptors and network slices, and determining the first network slice as the target network slice.

In a possible implementation, prior to querying the URSP, the method further includes: receiving the URSP from a mobile core network.

In a second aspect, implementations of the disclosure provide an apparatus for routing access. The apparatus is applicable to a UE and includes a communication unit and a processing unit. The communication unit is configured to obtain encrypted communication information of a target application, where the encrypted communication information is obtained by encrypting a traffic descriptor of the target application at a network server. The processing unit is configured to obtain the traffic descriptor of the target application by decrypting the encrypted communication information, and determine a target network slice according to the traffic descriptor. The communication unit is further configured to establish a data transmission link for the target application through the target network slice.

In a third aspect, implementations of the disclosure provide a UE. The UE includes a processor, a memory configured to store one or more programs, and a communication interface. The one or more programs are operable with the processor and include instructions for performing steps in any method of the first aspect of implementations of the disclosure.

In a fourth aspect, implementations of the disclosure provide a computer-readable storage medium. The computer-readable storage medium stores computer programs for electronic data interchange. The computer programs are operable with a computer to perform some or all of steps in any method of the first aspect of implementations of the disclosure.

In a fifth aspect, implementations of the disclosure provide a computer program product. The computer program product includes a non-transitory computer-readable storage medium storing computer programs. The computer programs are operable with a computer to perform some or all of steps in any method of the first aspect of implementations of the disclosure. The computer program product may be a software installation package.

It can be seen that, in implementations of the disclosure, the UE obtains the encrypted communication information of the target application, where the encrypted communication information is obtained by encrypting the traffic descriptor of the target application at the network server. Then, the UE obtains the traffic descriptor of the target application by decrypting the encrypted communication information, and determines the target network slice according to the traffic descriptor. Finally, the UE establishes the data transmission link for the target application through the target network slice. It can be seen that, in implementations of the disclosure, the UE can obtain the traffic descriptor by decrypting the encrypted communication information encrypted at the network server, which avoids abnormal operations such as tampering and forgery of the traffic descriptor by an application, and ensures the reliability of the target network slice determined according to the traffic descriptor, thereby improving the reliability of the data transmission link established according to the target network slice, and improving the security of the network.

What is claimed is:

1. A method for routing access, performed by user equipment (UE) and comprising:
   obtaining encrypted communication information of a target application;
   obtaining a traffic descriptor of the target application by decrypting the encrypted communication information;
   determining a target network slice according to the traffic descriptor;
   establishing a first data transmission link for the target application through the target network slice;
   receiving, from a core network, load information of at least two network slices comprising the target network slice, after sending a load information request to the core network;
   determining a load level of the target network slice according to load information of the target network slice;
   determining, according to the load information of the at least two network slices, a second network slice with a load level lower than a preset load value among the at least two network slices, sending to the core network request information for establishing a second data transmission link through the second network slice, and establishing the second data transmission link for the target application through the second network slice upon receipt of confirmation information from the core network, in response to the load level of the target network slice being greater than the preset load value;
   detecting a security level of target data, in response to the target application requesting to send the target data; and
   sending the target data via the second data transmission link established through the second network slice, in response to the security level of the target data being lower than a preset security level; or
   sending the target data via the first data transmission link established through the target network slice, in response to the security level of the target data being higher than or equal to the preset security level.

2. The method of claim 1, wherein obtaining the traffic descriptor of the target application by decrypting the encrypted communication information comprises:
   obtaining the traffic descriptor of the target application by performing symmetric decryption on the encrypted communication information.

3. The method of claim 1, wherein obtaining the traffic descriptor of the target application by decrypting the encrypted communication information comprises:
   obtaining the traffic descriptor of the target application by performing asymmetric decryption and symmetric decryption on the encrypted communication information.

4. The method of claim 1, wherein subsequent to obtaining the encrypted communication information of the target application, and prior to obtaining the traffic descriptor of the target application by decrypting the encrypted communication information, the method further comprises:
   obtaining a key for decrypting the encrypted communication information into the traffic descriptor.

5. The method of claim 4, wherein obtaining the key comprises:
extracting the key from a universal subscriber identity module (USIM);
obtaining the key from a non-access stratum (NAS) signaling received from a mobile core network, wherein the NAS signaling comprises the key; or
obtaining the key through an open network.

6. The method of claim 5, wherein obtaining the key through the open network comprises:
registering the UE with a mobile core network through the open network;
establishing a default protocol data unit (PDU) session with the mobile core network;
establishing a communication connection with a network server through the default PDU session; and
receiving the key from the network server.

7. The method of claim 1, wherein determining the target network slice according to the traffic descriptor comprises:
obtaining a first network slice corresponding to a query identifier by querying a UE routing selection policy (URSP) with the traffic descriptor as the query identifier, wherein the URSP comprises a correspondence between traffic descriptors and network slices; and
determining the first network slice as the target network slice.

8. The method of claim 7, wherein prior to querying the URSP, the method further comprises:
receiving the URSP from a mobile core network.

9. The method of claim 1, wherein the encrypted communication information is obtained by encrypting the traffic descriptor of the target application at a network server.

10. A user equipment (UE) comprising:
a memory configured to store one or more programs; and
a processor configured to invoke and execute the one or more programs to:
obtain encrypted communication information of a target application;
obtain a traffic descriptor of the target application by decrypting the encrypted communication information;
determine a target network slice according to the traffic descriptor;
establish a first data transmission link for the target application through the target network slice;
receive, from a core network, load information of at least two network slices comprising the target network slice, after sending a load information request to the core network;
determine a load level of the target network slice according to load information of the target network slice;
determine, according to the load information of the at least two network slices, a second network slice with a load level lower than a preset load value among the at least two network slices, send to the core network request information for establishing a second data transmission link through the second network slice, and establish the second data transmission link for the target application through the second network slice upon receipt of confirmation information from the core network, in response to the load level of the target network slice being greater than the preset load value;
detect a security level of target data, in response to the target application requesting to send the target data; and send the target data via the second data transmission link established through the second network slice, in response to the security level of the target data being lower than a preset security level; or
send the target data via the first data transmission link established through the target network slice, in response to the security level of the target data being higher than or equal to the preset security level.

11. The UE of claim 10, wherein the processor configured to obtain the traffic descriptor of the target application by decrypting the encrypted communication information is configured to invoke and execute the one or more programs to:
obtain the traffic descriptor of the target application by performing symmetric decryption on the encrypted communication information.

12. The UE of claim 10, wherein the processor configured to obtain the traffic descriptor of the target application by decrypting the encrypted communication information is configured to invoke and execute the one or more programs to:
obtain the traffic descriptor of the target application by performing asymmetric decryption and symmetric decryption on the encrypted communication information.

13. The UE of claim 10, wherein subsequent to obtaining the encrypted communication information of the target application, and prior to obtaining the traffic descriptor of the target application by decrypting the encrypted communication information, the processor is further configured to invoke and execute the one or more programs to:
obtain a key for decrypting the encrypted communication information into the traffic descriptor.

14. The UE of claim 13, wherein the processor configured to obtain the key is configured to invoke and execute the one or more programs to:
extract the key from a universal subscriber identity module (USIM);
obtain the key from a non-access stratum (NAS) signaling received from a mobile core network, wherein the NAS signaling comprises the key; or
obtain the key through an open network.

15. The UE of claim 14, wherein the processor configured to obtain the key through the open network is configured to invoke and execute the one or more programs to:
register the UE with a mobile core network through the open network;
establish a default protocol data unit (PDU) session with the mobile core network;
establish a communication connection with a network server through the default PDU session; and
receive the key from the network server.

16. The UE of claim 10, wherein the processor configured to determine the target network slice according to the traffic descriptor is configured to invoke and execute the one or more programs to:
obtain a first network slice corresponding to a query identifier by querying a UE routing selection policy (URSP) with the traffic descriptor as the query identifier, wherein the URSP comprises a correspondence between traffic descriptors and network slices; and
determine the first network slice as the target network slice.

17. The UE of claim 16, wherein prior to querying the URSP, the processor is further configured to invoke and execute the one or more programs to:
receive the URSP from a mobile core network.

18. The UE of claim 10, wherein the encrypted communication information is obtained by encrypting the traffic descriptor of the target application at a network server.

19. A non-transitory computer-readable storage medium storing computer programs which are operable with a processor to:
- obtain encrypted communication information of a target application;
- obtain a traffic descriptor of the target application by decrypting the encrypted communication information;
- determine a target network slice according to the traffic descriptor;
- establish a first data transmission link for the target application through the target network slice;
- receive, from a core network, load information of at least two network slices comprising the target network slice, after sending a load information request to the core network;
- determine a load level of the target network slice according to load information of the target network slice;
- determine, according to the load information of the at least two network slices, a second network slice with a load level lower than a preset load value among the at least two network slices, send to the core network request information for establishing a second data transmission link through the second network slice, and establish the second data transmission link for the target application through the second network slice upon receipt of confirmation information from the core network, in response to the load level of the target network slice being greater than the preset load value;
- detect a security level of target data, in response to the target application requesting to send the target data; and
- send the target data via the second data transmission link established through the second network slice, in response to the security level of the target data being lower than a preset security level; or
- send the target data via the first data transmission link established through the target network slice, in response to the security level of the target data being higher than or equal to the preset security level.

* * * * *